United States Patent [19]
Morino et al.

[11] 3,748,417
[45] July 24, 1973

[54] NEUTRAL POSITION DETECTOR SWITCH AND ACTUATING MEANS FOR VEHICLE TRANSMISSION

[75] Inventors: Hideki Morino; Katsunori Watanabe, both of Aichi-ken, Japan

[73] Assignee: Toyota Jidosha Kogyo Kabushiki Kaisha, Aichi-ken, Japan

[22] Filed: Feb. 17, 1972

[21] Appl. No.: 227,561

[30] Foreign Application Priority Data
Mar. 31, 1971 Japan................................ 46/23753

[52] U.S. Cl. ........................... 200/61.91, 200/61.88
[51] Int. Cl. ............................................. H01h 3/16
[58] Field of Search..................... 200/61.91, 61.88, 200/61.85, 61.28, 18, 17 R, 6 A, 4, 153 T

[56] References Cited
UNITED STATES PATENTS
2,324,819  7/1943  Butzbach................... 200/61.88 X
2,747,051  5/1956  Kommer et al................... 200/61.9

FOREIGN PATENTS OR APPLICATIONS
799,454  8/1958  Great Britain................... 200/61.88

*Primary Examiner*—J. R. Scott
*Attorney*—David Toren et al.

[57] ABSTRACT

A neutral position detector for vehicle transmissions, wherein a detent is provided in a rod operably located between a manual shift lever and a shift operating mechanism of the transmission. A switch mechanism operated in response to the positioning of a ball displaceable into and out of the detent by movement of said rod generates a first signal when the transmission is in neutral and a second signal when the transmission is shifted out of neutral.

6 Claims, 3 Drawing Figures

3,748,417

NEUTRAL POSITION DETECTOR SWITCH AND ACTUATING MEANS FOR VEHICLE TRANSMISSION

BACKGROUND OF THE INVENTION

This invention relates to a neutral position detector for a vehicle transmission of the type wherein a shift lever supported by a casing or extension housing and incorporating speed change gears is operated by a driver to selectively engage with the fork shaft of the shift mechanism through a rod. More particularly, the invention contemplates application in a transmission device wherein the selecting and shifting operations of the shift lever are transmitted to the rod as rotary motion and axial motion which are utilized to detect the neutral position of the transmission by deriving electrical signals representative of the aforementioned motions of the rod.

In recent years, efforts to ensure automobile safety and to protect drivers have given rise to a strong need for making a driver aware of whether he is faithfully utilizing the various safety devices with which the automobile is equipped or of whether the automobile itself is in a safe condition. For example, although the driver's seat in most vehicles is equipped with a safety seat belt, the driver is apt to neglect its use. Accordingly, it has been proposed to give warning to a driver when he is about to drive his car without using the seat belt. There have been proposed many methods of setting signal detecting points for giving such warning. The most appropriate is deemed to be one which utilizes the shifting positions of the transmission. For example, when a transmission is in the neutral position, power transfer from the engine to the transmission is shut off, and therefore no problem will arise. However, when the transmission is caused to perform a shifting operation, the clutch is engaged and vehicle motion is made possible, and accordingly a warning may be given to the driver by detecting the shifting of the transmission to apprise the driver that he is not using the seat belt at the time that he has performed a shifting operation. An additional example of the need for a transmission condition detector may arise when the driver has started the engine under a misapprehension that the transmission is in the neutral position, when in actuality it is not. Under such circumstances, the automobile will make a sudden start thereby giving rise to the possibility of inadvertent injury or damage. Consequently, it has been proposed to make the engine starting impossible unless the transmission is in the neutral position.

In addition to the above-described methods for confirming safety by detecting the neutral position of the transmission, it may be possible to give warning in cases where a car door is not fully closed in any position except neutral with the engine key "on" or, in the case of a dump truck, when the rear body of the truck is in the raised condition in any position except neutral with the engine key "on". Furthermore, in the case of an automobile equipped with an automatic constant-speed travelling device, it may be possible to relieve operation of the constant speed travelling device by detecting the passage of the transmission through the neutral position when the transmission is down-shifted to reduce the speed during travelling.

Accordingly, it is an object of the present invention to enable detection of the neutral position of a vehicle transmission, in order to most appropriately provide for operation of the above-described methods for confirming vehicle safety.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
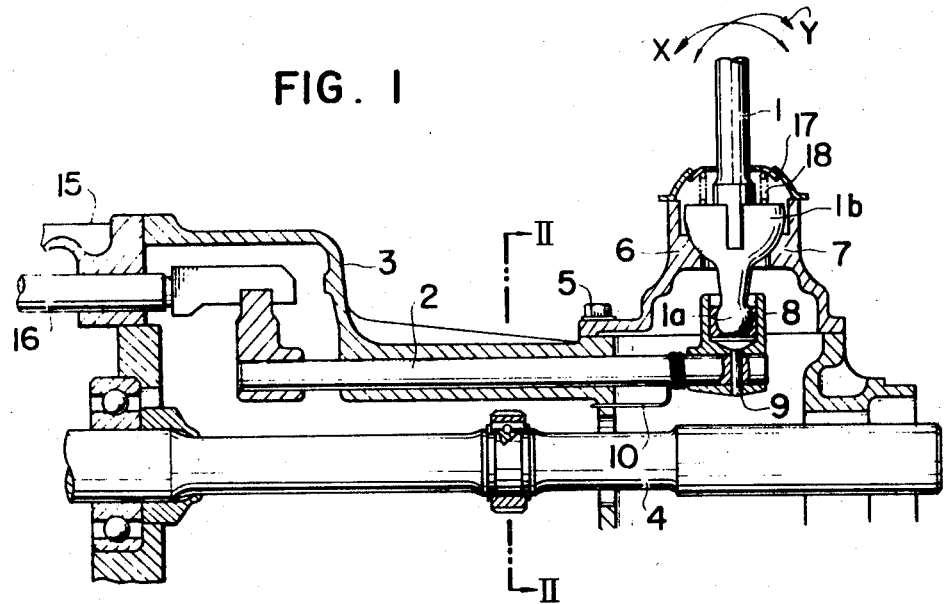
FIG. 1 is a sectional view of the shift operating mechanism of a transmission to which this invention is applied.

Referring now to FIG. 1, a casing 15 incorporating speed change gears (not shown) is provided with an extension housing 3, at the rear portion of which a retainer 6 is installed by means of a bolt 5. An output shaft 4 extending from the speed change gears passes through the extension housing 3. A shift lever 1 which is operated by a driver is inserted into the extension housing 3 by pressing an upper spherical portion 1b thereof against a spherical surface 7 of the retainer 6, thus enabling shifting operation in the direction of the arrow $X$ as well as selecting operation in the direction of the arrow $Y$. A rod 2 is supported in the extension housing 3 in a manner to enable both axial motion and rotary motion. The left end of the rod 2 is selectively engaged with a required fork shaft of a plurality of fork shafts 16 provided for changing the shifting range of the speed change gears. The right end of the rod 2 is integrally connected by means of a slotted spring pin 9 to a shift head 8, into which a lower spherical portion 1a of the shift lever 1 is inserted. A spring 10 for producing a select return force is located between the extension housing 3 and the shift head 8. The upper spherical portion 1b of the shift lever 1 is provided with a dust-proof cover 17. Furthermore, a downward spring force is exerted on the upper spherical portion 1b by means of a spring 18. By virtue of the abovementioned construction, when the shift lever 1 is in the neutral position and is caused to perform selecting operation in the direction of the arrow $Y$, the rod 2 is caused to rotate. When the shift lever 1 is caused to perform shifting operation in the direction of the arrow $X$, the rod 2 is moved in the axial direction.

Figure 2:
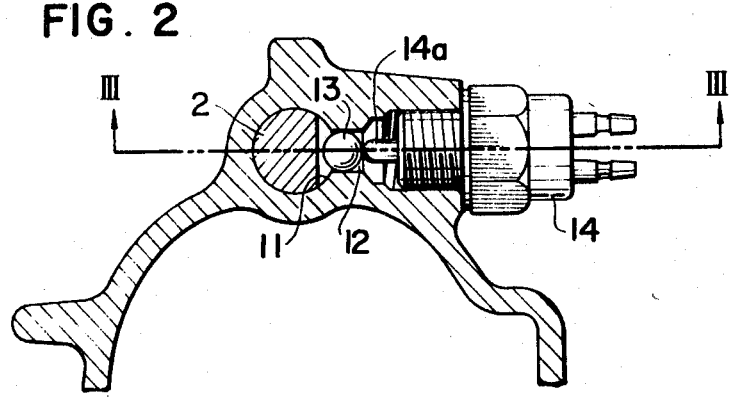
FIG. 2 is a sectional side view showing the neutral position detector of this invention together with the shift operating mechanism.
Figure 3:
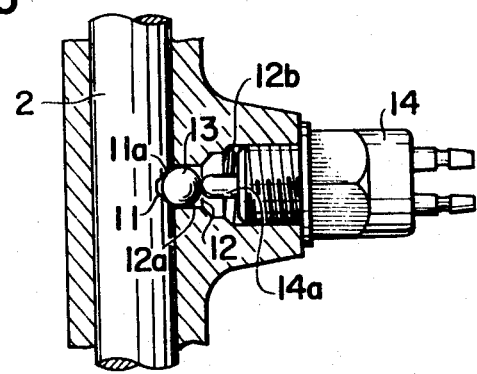
FIG. 3 is a sectional view taken along the line III—III of FIG. 2.

In the above-described shift operating mechanism, operation of the neutral position detector according to the present invention is provided by utilizing the motions of the rod 2. Referring now to FIGS. 2 and 3, the rod 2 is provided with an operating slot or detent 11 formed in a generally V-shape and having a tapered surface 11a at its lateral sides. The operating slot 11 may be provided at an arbitrary position in the longitudinal direction along the length of the rod 2. A hole 12 having a small diameter portion 12a and a threaded portion 12b is provided on the side of the extension housing 3 at the position opposite to the position selected for the operating slot 11. A ball 13 is interposed between the operating slot 11 and the small diameter portion 12a of the hole 12. When the shift lever 1 is in the neutral position as illustrated, the position of the operating slot 11 coincides with that of the small diameter portion 12a and the ball 13 is engaged within the tapered surface 11a, thus moving the ball 13 to its innermost postiion. When the shift lever 1 is caused to shift and the rod 2 is moved in the axial direction, the ball 13 is pushed out of the operating slot 11 to be displaced outwardly. The operating slot 11 is made slightly larger than the diameter of the small diameter portion 12a of the hole 12. Furthermore, since the rotary motion of the rod 2 during the selecting operation of the shift lever 1 is generally in the range of comparatively small angular displacements, the ball 13 is only slightly displaced outwardly by rotation of the rod 2 at the time of the selecting operation described above. Moreover, in order to completely eliminate displacement of the ball 13 at the time of a selecting operation, the operating slot 11 may be provided as a circumferential slot at the outer circumference of the rod 2.

A switch mechanism 14 whose operating lever 14a is always in contact with the ball 13 is screwed to the threaded portion 12b of the hole 12. When the ball 13 is situated at its innermost position, the switch mechanism 14 will generate a first signal, e. g., it is turned "off." When the ball 13 is pushed outwardly to press the operating lever 14a, the switch mechanism will generate a second signal, e. g., it is turned "on."

When the shift lever 1 is caused to perform selecting operation, the rod 2 experiences a rotary motion, but the ball 13 is kept engaged with the operating slot 11 and the operating lever 14a is not operated. Consequently, the switch mechanism 14 is, for example, turned "off." Then, when the shift lever 1 is caused to perform a shifting operation, the ball 13 is displaced outwardly due to the motion of the rod 2 in the axial direction, thus pressing the operating lever 14a. Consequently, the switch mechanism 14 is converted, for example, to the "on" position. Accordingly, it is possible to determine the neutral position of the transmission by detecting whether the switch mechanism 14 is in the "on" or "off" position in accordance with the electric signal derived therefrom.

As described above, in the operation of the neutral position detector of the present invention, the switch mechanism 14 issues an "off" signal when the transmission is in the neutral position, but issues an "on" signal when a shifting operation is being performed. Accordingly, driving safety can be easily confirmed by connecting the switch mechanism 14 to another switch mechanism provided at the seat belt or to the engine starting electric circuit. Furthermore, inasmuch as the neutral position detector of this invention utilizes sensing means, such as the slot 11 and ball 13, to detect the position of the rod 2 and to utilize motion of this rod to generate a signal representative of the condition of the transmission, the construction of the detector is greatly simplified. Therefore, a detector constructed in accordance with the present invention is considered highly advantageous from a practical point of view. Although the preferred embodiment of this invention has been described with reference to a transmission in which the shift operating mechanism is provided within an extension housing 3, it should be understood that the principles of the invention may be applied in a transmission in which the shift operating mechanism is provided directly in the casing.

While a specific embodiment of the invention has been shown and described in detail to illustrate the application of the inventive principles, it will be understood that the invention may be embodied otherwise without departing from such principles.

What is claimed is:

1. A neutral position detector for a vehicle transmission, said transmission including a manually operable shift lever, speed change gear means, and a rod operably interposed between said shift lever and said gear means, said rod being actuated by movement of said shift lever to effect shifting of said transmission, said shift lever being mounted for a compound movement within at least two different paths to effect movement of said rod both axially and rotatably during operation of said transmission, with movement of said shift lever within one of said paths effecting axial movement of said rod and with movement of said lever within the other of said paths effecting rotational movement of said rod, said neutral position detector comprising switch means for deriving a first or a second signal indicative of the set condition of the said transmission for permitting a determination of whether said transmission is in the neutral position, said sensing means being interposed between said rod and said switch means and being displacable in response to movement of said rod to actuate said switch means in accordance with the position of said rod, said sensing means being displacable to effect said first signal when said shift lever is moved in one of said paths and said second signal when said shift lever is moved in the other of said paths.

2. A detector according to claim 1 wherein said sensing means are arranged to actuate said switch means to derive said first signal when said rod is in a predetermined axial position and to derive said second signal when said rod is displaced from said predetermined axial position, said sensing means being unaffected with regard to actuation of said switch means by rotary motion of said rod.

3. A detector according to claim 1 wherein said sensing means comprise a detent in said rod, and switch actuating means positionable within said detent, said detent being shaped and sized to effect displacement of said actuating means from within said detent to actuate said switch means when said rod is moved to shift said transmission between neutral and other operating conditions.

4. A detector according to claim 3 wherein said switch actuating means include a ball interposed between said detent and said switch means, said ball being sized for displacement into and out of said detent upon movement of said rod.

5. A detector according to claim 4 wherein said ball is retained within said detent during rotational movement of said rod while in a predetermined axial position, and is displaced therefrom upon axial movement of said rod from said predetermined position.

6. A detector according to claim 5 wherein said rod is in said predetermined axial position when said transmission is in neutral and is axially moved therefrom when said transmission is shifted out of neutral, said ball operating to actuate said switch means to derive said first signal when said ball is located within said detent and to derive said second signal when said ball is displaced therefrom.

* * * * *